Feb. 19, 1924.

E. KENNEDY

PIPE FITTING

Filed June 5, 1922

INVENTOR
Edward Kennedy

BY C. P. Goepel
ATTORNEY

Patented Feb. 19, 1924.

1,483,891

UNITED STATES PATENT OFFICE.

EDWARD KENNEDY, OF NEW YORK, N. Y.

PIPE FITTING.

Application filed June 5, 1922. Serial No. 566,106.

*To all whom it may concern:*

Be it known that I, EDWARD KENNEDY, a citizen of the United States, and a resident of the city, county, and State of New York, have invented a certain new and useful Improvement in Pipe Fittings, of which the following is a specification.

This invention relates to pipe fittings and particularly to waste or soil pipe trap connections. It is the primary object and purpose of the present invention to provide an improved ventilated soil or waste pipe trap such as is commonly used in building constructions.

In one embodiment of the invention I provide inlet and outlet pipe connections at opposite sides of the pipe fitting together with hand holes and an air pipe connection with the inlet end of the fitting located between the hand holes. The inner end of the inlet pipe connection is reinforced and threaded and one of the hand holes is of sufficient diameter so as to permit of the insertion of a plug therethrough for detachable engagement with the threads of said reinforced portion so that the inlet connection may be tightly closed during the making of a test.

It is another object of the invention to provide a pipe fitting as above characterized, which is of such form and construction that it may be readily cored in casting the fitting.

With the above and other objects in view, the invention consists in the improved pipe fitting and in the form, construction and relative arrangement of its several parts as will be hereinafter more fully described, illustrated in the accompanying drawings and subsequently incorporated in the subjoined claims.

In the drawings wherein I have disclosed several desirable and practical embodiments of the invention and in which similar reference characters designate corresponding parts throughout the several views.

Figure 1:
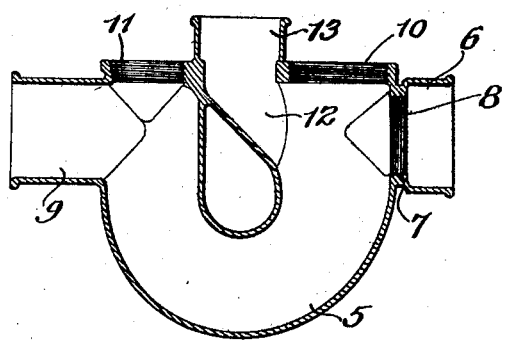
Figure 1 is a vertical sectional view through a pipe fitting disclosing one embodiment of my invention.
Figure 2:
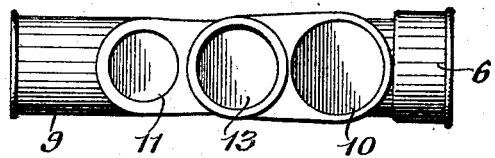
Figure 2 is a top plan view thereof.

Referring in detail to the drawings and more particularly to Figures 1 and 2 thereof, 5 designates the body of a trap fitting of the conventional U-shaped form. One end of this U-shaped body portion is provided at its outer side with a laterally projecting inlet pipe connection 6. At the juncture of this connecting nipple with the body of the fitting, the same is reinforced as at 7 and provided with the internal screw threads 8 for a purpose which will be presently stated. The opposite end of the U-shaped body 5 of the fitting is likewise provided with a laterally projecting outlet connection 9. The upwardly projecting end portions of the body 5 above the inlet and outlet pipe connections provide hand holes 10 and 11 respectively, which are preferably screw threaded to receive suitable closure plugs. It will be noted that the hand hole 10 is of appreciably greater diameter than the hand hole 11 and also of greater diameter than the internal threaded surface of the reinforcement 7.

At the inner side of the end portion of the body 5 which terminates in the hand hole 10, said body is provided with an obliquely inclined passage 12 the walls of which are integral with the opposed walls of the end portions of said trap body, said passage opening upwardly through a vertically disposed air pipe connection 13 located between the hand holes 10 and 11.

In the use of the fitting above described, the inlet and outlet pipes are connected to the opposite sides of the fitting and the air pipe suitably connected to the upstanding nipple 13 and rendered fluid-tight by caulking or other suitable means. It is of course, understood that normally, the hand holes 10 and 11 are closed by screw plugs. When it is desired to make a test of the fitting the plug for the hand hole 10 is removed and a smaller pipe plug is passed downwardly through said hole and engaged with the threads 8 to thereby tightly close the inlet pipe connection and shut off the flow of water through the trap fitting. The fitting is thoroughly ventilated through the air pipe connection and the passage 12.

Figure 3:
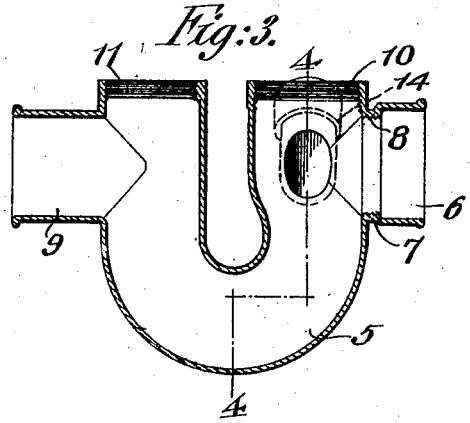
Figure 3 is a view similar to Figure 1, illustrating a slightly modified construction.
Figure 4:
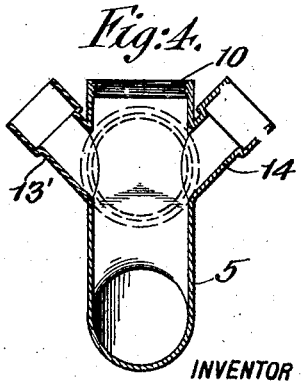
Figure 4 is a transverse section taken on the line 4—4 of Figure 3.

In Figures 3 and 4 of the drawings I have illustrated a slightly different form of the invention wherein instead of centrally locating the air pipe connection 13, I provide an obliquely inclined air pipe connection or nipple 13′ extending upwardly from one side of the inlet end of the body of the trap. A similar pipe connection or nipple 14 is provided at the opposite side of the trap body and to the latter nipple an additional drain or waste pipe connection may be made. In this form of the invention, like that first described, a closure plug for the inlet connection may be passed through the hand hole at the inlet end of the trap body to tightly close the inlet connection while making a test. Either embodiment of the invention as herein proposed is very simple in construction and satisfactory in the practical operation of a ventilated trap fitting of this character. It is possible, however, that other forms of the fitting might be devised, and it is, therefore, to be understood that while I have herein suggested certain desirable constructions, the device might also be embodied in still other alternative forms and I accordingly reserve the privilege of adopting all such legitimate changes as may be fairly embodied within the spirit and scope of the invention as claimed.

I claim:

1. A pipe fitting of the character described, comprising a U-shaped trap body having inlet and outlet pipe connections and hand holes adjacent to said inlet and outlet connections, the inlet pipe connection at its inner end being threaded and of appreciably less diameter than the adjacent hand hole whereby a closure plug for said inlet connection may be passed through said hand hole and engaged with said threads, and an air pipe connection at the upper side of the trap body communicating by an inclined passage with the passage therethrough.

2. A pipe fitting of the character described, comprising a U-shaped trap body having inlet and outlet connections at its opposite sides, an air pipe connection located between the ends of the trap body and connected by an inclined passage with the interior of the trap body, said passage having walls integral with the inner sides of the end portions of the trap body.

3. A pipe fitting of the character described, comprising a trap body having parallel end portions and inlet and outlet pipe connections at the outer sides of the respective end portions of said body, said end portions of the body providing hand holes adapted to be closed by suitable plugs and provided with an obliquely inclined air passage having walls integral with the opposed sides of the parallel ends of the trap body and opening into said trap body opposite to the inlet pipe connection.

4. A pipe fitting of the character described, comprising a trap body having parallel end portions, and inlet and outlet pipe connections at the outer sides of the respective end portions of said body, said end portion of the body portion providing hand holes adapted to be closed by plugs and provided with an obliquely inclined air passage having walls integral with the opposed sides of the parallel ends of the trap body and opening into said trap body opposite to the inlet pipe connection, the inlet pipe connection at its inner end being threaded whereby a closure plug for said inlet connection may be passed through said hand hole and engage with said threads.

5. A pipe fitting of the character described, comprising a U-shaped trap body having inlet and outlet connections at its opposite sides, an air pipe connection located between the ends of the trap body and connected by an inclined passage with the interior of the trap body, said passage having walls integral with the inner faces of the end portions of the trap body.

In testimony that I claim the foregoing as my invention, I have signed my name hereunder.

EDWARD KENNEDY.